Patented Feb. 14, 1933

1,897,705

UNITED STATES PATENT OFFICE

HANS MÄNDLEN, OF GAISENHEIM, AND HANS HUBER, OF WIESBADEN-BIEBRICH, GERMANY, ASSIGNORS TO THE FIRM CHEMISCHE WERKE VORM- H. & E. ALBERT, OF WIESBADEN-BIEBRICH, GERMANY

METHOD OF PRODUCING OR REGENERATING ALKALI-CARBONATES FROM ALKALINE PHOSPHATE-SOLUTIONS

No Drawing. Application filed May 14, 1931, Serial No. 537,488, and in Germany May 14, 1930.

The investigation of the sparing solubility of alkaline phosphates in the presence of salts which are strongly dissociated hydrolytically, such as alkali aluminates, was an indication of the present process of recovering the alkali phosphates and/or regenerating or producing alkali carbonate, according as ready-made alkali carbonate, or alkali sulphate and carbon, have been employed for the production of the hydrolytically dissociated saline solution.

A solution of sodium-aluminate for instance is obtained by the pyrogenic reaction of bauxite with sodium carbonate or with sodium sulphate and carbon and dissolving the melt in water. This lye usually is treated according to the Bayer process by heating with caustic soda under pressure and stirring in order to obtain a pure hydrate of alumina. The resulting lye is very rich in its content of free caustic alkali and relatively very poor in its content of alumina. To obtain the residual small quantities of alumina it has hitherto been necessary to convert the whole alkali, both the free caustic alkali and the alkali combined with the alumina, into alkali-carbonate by introducing carbon dioxide.

According to the present invention the caustic alkali is combined with phosphoric acid and removed from the solution in the form of alkali phosphate, the alkali aluminate remaining in solution. Only after the alkali-phosphate is completely removed, is carbon dioxide introduced into the solution to precipitate the remainder of the alumina, thus converting the caustic alkali into alkali carbonate.

According to the invention the phosphoric acid is removed from such solutions in the way hereinafter to be described. The dissolved salt does not crystallize out completely from a solution containing pure trisodium phosphate before the solution sets or solidifies. The solubility of the salt at the freezing point amounts to about ½ percent. It was found however that the high temperature coefficient of solubility of the alkali-phosphate can be completely utilized, if the separation of the alkali phosphate be effected from an alkaline phosphate alumina solution. According to the present invention this much more complete separation is based on the following facts:—

1. That the alkali phosphate is practically insoluble at the freezing point in a solution still containing alkali aluminate;
2. That the solubility of the alkali phosphate is lowered by the presence of hydrolytically dissociable salts giving an alkaline reaction.

In order to render alkali phosphate insoluble at ordinary temperature the residual solution must have a concentration of at least 30° Bé., which concentration is scarcely attainable in practice. Furthermore this method would be inoperative in view of the presence of foreign salts contaminating the precipitated fractions. It is absolutely necessary to cool down the solution far below ordinary temperature, if the alkali phosphate is to be crystallized out as completely as possible in one operation. According to the invention it is however possible to operate with the minimum super-cooling by adding a concentrated solution of sodium aluminate to the alkaline solution of alumina which still contain small quantities of phosphoric acid after fractional crystallization at ordinary temperature. The concentrated solution of sodium-aluminate may be produced by a fresh pyrogenic conversion or may be obtained by concentrating a dilute solution of sodium-aluminate. It is necessary that this solution should be a concentrated one as the precipitation of the hydrated alumina with carbon dioxide is at an optimum when using a lye of at least 30° Bé. strength.

The tri-sodium phosphate thus precipitated can be converted into disodium phosphate in known manner with the aid of carbon dioxide and fractional crystallization.

The process herein described may advantageously be combined with the processes of treating bauxite and working up aluminium phosphates by alkalies, since in the process of dissolving such materials in alkalies the alumina collects in the lye. The aluminium phosphates used may be of natural or artificial origin such as for example the sludgy residues obtained in the industry of making phosphates by neutralizing the usual crude phosphoric acid.

The process of the present invention may be used with great advantage when manufacturing hydrated alumina for the reason that a relatively high temperature during the year decreases the yield of sodium carbonate crystallizing from the carbonated aluminate-lyes.

The process may be operated independently of bauxite conversion by decomposing phosphates of alumina or of iron and alumina preferably by pyrogenic methods. Instead of decomposing natural phosphates mixtures of ferro-phosphorus and bauxite or the like may be converted with alkali sulphate or carbonate. Mixtures of sodium and potassium compounds may be used for conversion, in which case the sodium phosphate is precipitated, while the potash compounds, for instance potassium aluminate form alumina and when treated with carbon dioxide, potassium carbonate.

The separation of the alkali phosphate may be effected according to the invention and in the manner described in the presence of other hydrolytically dissociable salts such as beryllates, plumbates, stannates and the like instead of alkali aluminate.

*Example 1*

Basic aluminium phosphates of the general formula:

$$Al(OH)_3(PO_4)_2$$

which may be obtained for example by the hydrolysis of natural phosphate of lime by heating them under pressure with an acid solution of natural aluminium silicates, can be dissolved in caustic alkali solution by wet or by pyrogenic processes. A NaOH lye of 10° Bé. containing 300 parts $Na_2O$ brings 150 parts $Al_2O_3$ and 140 parts $P_2O_5$ into solution at boiling temperature. To keep the alumina in solution as aluminate and to avoid the preecipitation of basic alumina phosphates in cooling to this solution a caustic sodium solution containing no more than 100 parts of $Na_2O$ must be added thereto.

When cooled down to $-5°$ C. the whole of the phosphoric acid crystallizes out in form of trisodium phosphate. The residual aluminate-lye is worked up in known manner with the aid of $CO_2$ into alumina and sodium carbonate.

*Example 2*

38 parts of the trisodium phosphate containing water of crystallization, prepared in the manner set forth in Example 1, are dissolved in 85 parts of hot water and treated with $CO_2$.

When cooled down to $-2°$ C. disodium phosphate separates quantitatively. A pure solution of sodium carbonate remains which may be concentrated.

We claim:—

1. A process of treating alkaline solutions containing alumina and phosphate ions which comprises super-cooling the liquid whereupon tri-alkali phosphate separates out quantitatively and treating the residual aluminate liquor with carbon dioxide in known manner for the production of alumina and alkali carbonate.

2. A process of treating basic aluminium phosphates, which comprises dissolving said phosphates in caustic alkali solution, thus producing tri-alkali phosphate and a hydrolytically dissociable salt (alkali aluminate) adding concentrated alkali aluminate solution to the reaction mixture, super-cooling the liquid whereupon tri-alkali phosphate separated out quantitatively and treating the residual aluminate liquor with carbon dioxide in known manner for the production of alumina and alkali carbonate.

3. A process of treating basic aluminium phosphates, which comprises dissolving said phosphates in caustic alkali solution, thus producing tri-alkali phosphate and a hydrolytically dissociable salt (alkali aluminate) adding an excess of caustic alkali to keep the alumina produced in solution, super-cooling the liquid whereupon tri-alkali phosphate separates out quantitatively and treating the residual aluminate liquor with carbon dioxide in known manner for the production of alumina and alkali carbonate.

4. A process of treating basic aluminium phosphates, which comprises dissolving said phosphates in caustic alkali solution, thus producing trialkali phosphate and a hydrolytically dissociable salt (alkali aluminate), super-cooling the liquid whereupon tri-alkali phosphate separates out quantitatively and dissolving said tri-alkali phosphate in water in the warm, treating it with carbon dioxide, the solution being thereupon cooled, whereupon the secondary alkali phosphate separates out quantitatively, sodium carbonate remaining in solution.

In testimony whereof we affix our signatures.

HANS MÄNDLEN.
HANS HUBER.